United States Patent
Millan Marco

(10) Patent No.: US 8,308,056 B2
(45) Date of Patent: Nov. 13, 2012

(54) METHOD FOR OBTAINING INFORMATION ASSOCIATED WITH A LOCATION

(75) Inventor: Pedro Millan Marco, Tarragona (ES)

(73) Assignee: Universitat Rovira I Virgili, Tarragona (ES)

( * ) Notice: Subject to any disclaimer, the term of this patent is extended or adjusted under 35 U.S.C. 154(b) by 0 days.

(21) Appl. No.: 13/123,081

(22) PCT Filed: Oct. 6, 2009

(86) PCT No.: PCT/ES2009/070420
§ 371 (c)(1),
(2), (4) Date: Apr. 7, 2011

(87) PCT Pub. No.: WO2010/040883
PCT Pub. Date: Apr. 15, 2010

(65) Prior Publication Data
US 2011/0192895 A1    Aug. 11, 2011

(30) Foreign Application Priority Data
Oct. 7, 2008    (ES) .................................. 200802842

(51) Int. Cl.
| G06F 17/00 | (2006.01) |
| G06F 7/00 | (2006.01) |
| G06K 7/00 | (2006.01) |
| G06K 7/10 | (2006.01) |
| G06K 9/80 | (2006.01) |
| G06K 9/36 | (2006.01) |

(52) U.S. Cl. ... 235/375; 235/376; 235/435; 235/462.09; 235/462.01; 235/462.1

(58) Field of Classification Search .................. 235/375, 235/376, 435, 62.09, 462.01, 462.1
See application file for complete search history.

(56) References Cited

U.S. PATENT DOCUMENTS
7,930,342 B2 * 4/2011 Mattila et al. .................. 709/203
(Continued)

FOREIGN PATENT DOCUMENTS
EP    1 085 428    3/2001
(Continued)

OTHER PUBLICATIONS
International Search Report dated Jan. 21, 2010, from corresponding International Application No. PCT/ES2009/070420.

*Primary Examiner* — Daniel Walsh
(74) *Attorney, Agent, or Firm* — Katten Muchin Rosenman LLP

(57) ABSTRACT

The method of the present invention allows obtaining location associated information (3) through the use of a telecommunications device (2) and a two-dimensional code (1) in which the information is stored. The information obtained relates to the geographical position of the two-dimensional code (1), i.e., the location (3), as well as to additional data such as a description thereof, a contact telephone number or its opening hours. The information may be presented according to the language preferences of the user, the two-dimensional code (1) having at least three languages, and it being possible to access a repository with a great number of alternatives or to also translate the content if the repository does not contain the translation in any of the selected languages. The translation will be obtained by accessing the repository with a unique key which includes data relating to the geographical position of the location (3).

10 Claims, 3 Drawing Sheets

U.S. PATENT DOCUMENTS

| | | | |
|---|---|---|---|
| 2001/0016068 A1* | 8/2001 | Shibata | 382/195 |
| 2003/0069693 A1* | 4/2003 | Snapp et al. | 701/213 |
| 2003/0212996 A1* | 11/2003 | Wolzien | 725/60 |
| 2005/0267647 A1* | 12/2005 | Kamdar et al. | 701/1 |
| 2006/0212601 A1* | 9/2006 | Hampton | 709/245 |
| 2006/0271283 A1* | 11/2006 | Fraser et al. | 701/209 |
| 2007/0032247 A1* | 2/2007 | Shaffer et al. | 455/456.1 |
| 2007/0124077 A1* | 5/2007 | Hedlund | 701/300 |
| 2007/0150130 A1* | 6/2007 | Welles et al. | 701/19 |
| 2007/0150186 A1* | 6/2007 | Ingulsrud | 701/211 |
| 2007/0206749 A1* | 9/2007 | Pincu et al. | 379/142.1 |
| 2007/0264968 A1* | 11/2007 | Frank et al. | 455/404.2 |
| 2007/0264969 A1* | 11/2007 | Frank et al. | 455/404.2 |
| 2008/0061146 A1* | 3/2008 | Komaki | 235/462.41 |
| 2008/0071749 A1* | 3/2008 | Schloter | 707/3 |
| 2008/0183377 A1* | 7/2008 | O'Clair | 701/200 |
| 2008/0215202 A1* | 9/2008 | Breed | 701/25 |
| 2009/0012704 A1* | 1/2009 | Franco et al. | 701/200 |
| 2009/0098882 A1* | 4/2009 | Yoon | 455/456.1 |
| 2009/0143984 A1* | 6/2009 | Baudisch et al. | 701/300 |
| 2009/0177603 A1* | 7/2009 | Honisch | 706/45 |
| 2010/0217525 A1* | 8/2010 | King et al. | 701/300 |
| 2010/0279710 A1* | 11/2010 | Dicke et al. | 455/456.3 |
| 2011/0074629 A1* | 3/2011 | Khan et al. | 342/357.64 |

FOREIGN PATENT DOCUMENTS

| | | |
|---|---|---|
| EP | 1 282 055 | 2/2003 |
| EP | 1 582 844 | 10/2005 |
| JP | 2004-213191 | 7/2004 |
| JP | 2006-202264 | 8/2006 |
| JP | 2006-318114 | 11/2006 |
| WO | 2004/080097 | 9/2004 |

* cited by examiner

METHOD FOR OBTAINING INFORMATION ASSOCIATED WITH A LOCATION

FIELD OF THE INVENTION

The present invention belongs to the field of two-dimensional codes, which codes can be scanned and decoded by a device, thus obtaining the information contained in the code. Specifically, the codes described in the present invention relate to codes which store geographical location data relating to the position in which said codes are stored together with additional information of said position or location. The information is stored in the code in at least three languages, it being possible to access a translation to additional languages through the communication possibilities of the devices which can scan and decode said codes, such as for example a mobile telephone or an electronic diary.

BACKGROUND OF THE INVENTION

Two-dimensional codes have been known since the mid nineties. Said codes allow being read as bar codes, however instead of scanning the information in one direction, the information is provided in two dimensions, for this reason they are known as two-dimensional codes or matrix codes.

There are a number of applications of said two-dimensional codes, such as for stock management, for example.

Other applications of two-dimensional codes are those related to providing information with respect to the geographical position where the code is located. Japanese Patent Application JP 2004/213191 describes a code providing said information.

Application JP 2006/202264 shows the fact that useful or relevant information with respect to a shop, a building or a service is included in a two-dimensional code. Scanning the two-dimensional code thus enables having said information displayed in the mobile telephone, for example. Said information would be displayed in that language in which the information was stored in the code.

Another application described in Japanese Application JP 2006/318114 is the application to facilitate, to some extent, translations, including a word together with its translation or meaning in the two-dimensional code.

DESCRIPTION OF THE INVENTION

The invention relates to a method for obtaining location associated information, said information being contained in a two-dimensional code close to the location.

The information stored in the two-dimensional code may be, for example, the name of the location or the establishment, a telephone number for the establishment or location associated information, its opening hours or webpage in the case of a shop. If a restaurant is in the location, data relating to culinary type and recommended dishes could be included. If the code is in a museum, a list of recommended painters and the rooms where their best works are located could be included in the two-dimensional code. Given the versatility of two-dimensional codes, the specific embodiments of the invention, i.e., the information included in the code, will be countless. In any of the cases, the information will be stored according to the Unicode Standard (UTF-8), which enables coding the information in any alphabet.

The two-dimensional code will be placed close to the location such that the relationship existing between the content of the code and the location is clear. Typically, the code will be located next to the access door or in a support designed for such purpose and properly signaled.

For the purpose of decoding the two-dimensional code, the latter must be scanned by a telecommunications device provided with a camera, such as a mobile telephone for example. Given the requirement that the device is able to be connected to a server, as will be discussed below, the device must be a device capable of performing said action, i.e., a telecommunications device.

The telecommunications device will have a configured ordered list of languages in which the user wishes to obtain the information, such that if the latter is available in two languages, the language being in the best position in the ordered list of the telecommunications device will be chosen, i.e., information in the language selected in the first place would be preferred over any other, the second language will be selected over the third and the following but not over the first, and so on and so forth.

According to the invention, the information contained in the two-dimensional code will be obtained by performing the steps describe below.

Firstly, the scanned two-dimensional code is decoded. To that end the telecommunications device must have the decoding application which can be obtained by connecting the device to the telecommunications provider thereof or through Internet. Once the two-dimensional code is decoded, a message provided in bytes will be obtained, the information from the first ones corresponding to the following data.

Information relating to a signature will be stored in the first and second bytes. The third byte corresponds to a status byte. The fourth, fifth and sixth bytes store information with respect to the latitude coordinate of the point where the two-dimensional code is located. In parallel, the seventh, eighth and ninth bytes save information with respect to the longitude coordinate of the point where the two-dimensional code is located. The tenth byte comprises information with respect to a sequential identification number. Commencing from the eleventh byte, the two-dimensional code comprises information relating to the location of the two-dimensional code in at least three languages.

Once the code is scanned and interpreted, it is treated to be displayed to the user. Out of the data stored in the code, data relating to the latitude coordinate or longitude coordinate are indifferent for the selected language, therefore they could be formatted and presented to the user without having to perform any additional operation.

Referring to the additional information, the latter is coded in at least three languages for the purpose of being able to cover a greater number of users, including, for example, Spanish, Catalan and English for codes in Catalonia or Spanish, English and Japanese for codes in Seville, the device must display only one of the at least three languages present depending on the ordered list of languages established in the telecommunications device. Thus, a device in Catalonia the language selection of which is Catalan, Spanish and English, will obtain the information in Catalan, since this language is the language of priority over Spanish and both languages are present in the two-dimensional code, whereas in Seville the information will be obtained in Spanish since it does not have the code with the information in Catalan and Spanish is the language of priority over English. In both cases, an English-speaking user would obtain the information in English.

If the device was configured with a language selection which was Swedish, German and Russian, the code would not contain information to be displayed directly in the previous two examples since there is not a coinciding language in both the list of the code and the list of the device. In this case, server access will be chosen in order to obtain a translation of the information relating to the location of the two-dimensional code.

Server access must be performed such that the parameters used are a unique key, i.e., through said key the information relating to the location is accessed in different languages which are stored in the server. Said unique key is based on the status information, latitude coordinate, longitude coordinate and sequential number stored in the message.

The status contains information with respect to the version of the code, therefore there is a need to have this data when performing the search. Obviously, the longitude and latitude data clearly define a single location. However, due to possible changes or transfers in the premises in said location, the information contained in the code may have varied, for example data referring to a bakery becomes the data referring to a fruit shop. For this purpose, the data of the bakery would be coded with a sequential number equal to 1, whereas the data of the fruit shop with a 2, thus preventing the possible duplicity of information and system error.

Additionally, the ordered list of languages will be sent to the unique key such that a sequential search will be performed in the server starting with the language of priority until a translation into a language selected by the user is found.

Thus, a method simultaneously capable of giving information about the geographical position of the location without the need of having a GPS, as well as providing value-added information to the user, this information being provided according to the language preferences of the user, is presented.

The search proposed in the preceding paragraph could be performed by accessing a repository in which the translation of the information in at least three languages is stored for each unique key. Thus, if any of these three languages coincides with one of the languages of the ordered list selected by the user, the information will be sent in that language having the highest priority. In the aforementioned case, German will prevail over Russian if both languages, and not Swedish, are saved in the repository.

If there is no information in any of the selected languages in the repository, the information will be automatically translated into the language of priority within the list of languages of the telecommunications device through an automatic translation means such as Google, for example. The information obtained by this means may be incorporated in the repository in the absence of a person checking the suitability of the translation performed automatically.

Depending on whether or not a direct translation is possible, or on the quality of said translations, a third language acting as bridge between the information of the two-dimensional code and the language of priority established in the telecommunications device could be used. Said third language may be, for example, English. Thus, the information of the code will be translated into English, or another third language, for subsequently translating the result into the language of priority. Due to the accumulative errors that can be produced after the two automatic translations, the end user will be notified of this circumstance of using automatic translations.

With respect to status byte, it will contain information with respect to the version of the code used and additional data with respect to the longitude and latitude coordinates. With respect to the longitude coordinate, the two most significant bits will be stored in this byte, with respect to the latitude coordinate, the most significant bit will be stored.

Thus, for the longitude it will have three bytes plus two additional bits, which thus allows establishing the longitude with a precision greater than one meter. The latitude will have three bytes plus an additional bit, also being able to establish the longitude with a precision greater than one meter. Said precisions have been calculated by considering that the maximum parallel has approximately 40,000 kilometers and a meridian approximately 20,000 kilometers.

With respect to the version of the code, three possibilities are contemplated depending on whether or not data of the height over an origin or height reference which could be established according to the version of the code, are present, and on the format of said information of the height at which the two-dimensional code is placed.

The first case is that in which there is no information of height, thus enabling the sequential number to occupy the entire tenth byte.

In the second case, as in the previous case, the sequential number occupies the entire tenth byte, including two additional bytes for the information of height, the units thereof being meters. Therefore, the range covered in this second case is 65,536 meters from the established origin of heights.

In the third case, the tenth byte is divided to include data of the sequential number and the four most significant bits of the height. The eleventh byte will likewise include information of height, being able to cover values of height up to 4,096 meters from the established origin of heights.

Both in the second and third cases, the values of height will be incorporated in the unique key. As a result of the fact that the status byte is transmitted, and that the latter contains information with respect to which version is being used, the server access could cover the three proposed options since it allows determining the meaning of each of the first twelve bytes as a result of the information of the version.

DESCRIPTION OF THE DRAWINGS

To complement the description that is being made and for the purpose of aiding to better understand the features of the invention, a set of drawings is attached as an integral part of said description in which the following has been depicted with an illustrative and non-limiting character.

PREFERRED EMBODIMENT OF THE INVENTION

A preferred embodiment of the method for obtaining location associated information (3) forming the object of this invention is described below with reference to the figures.

Figure 1:
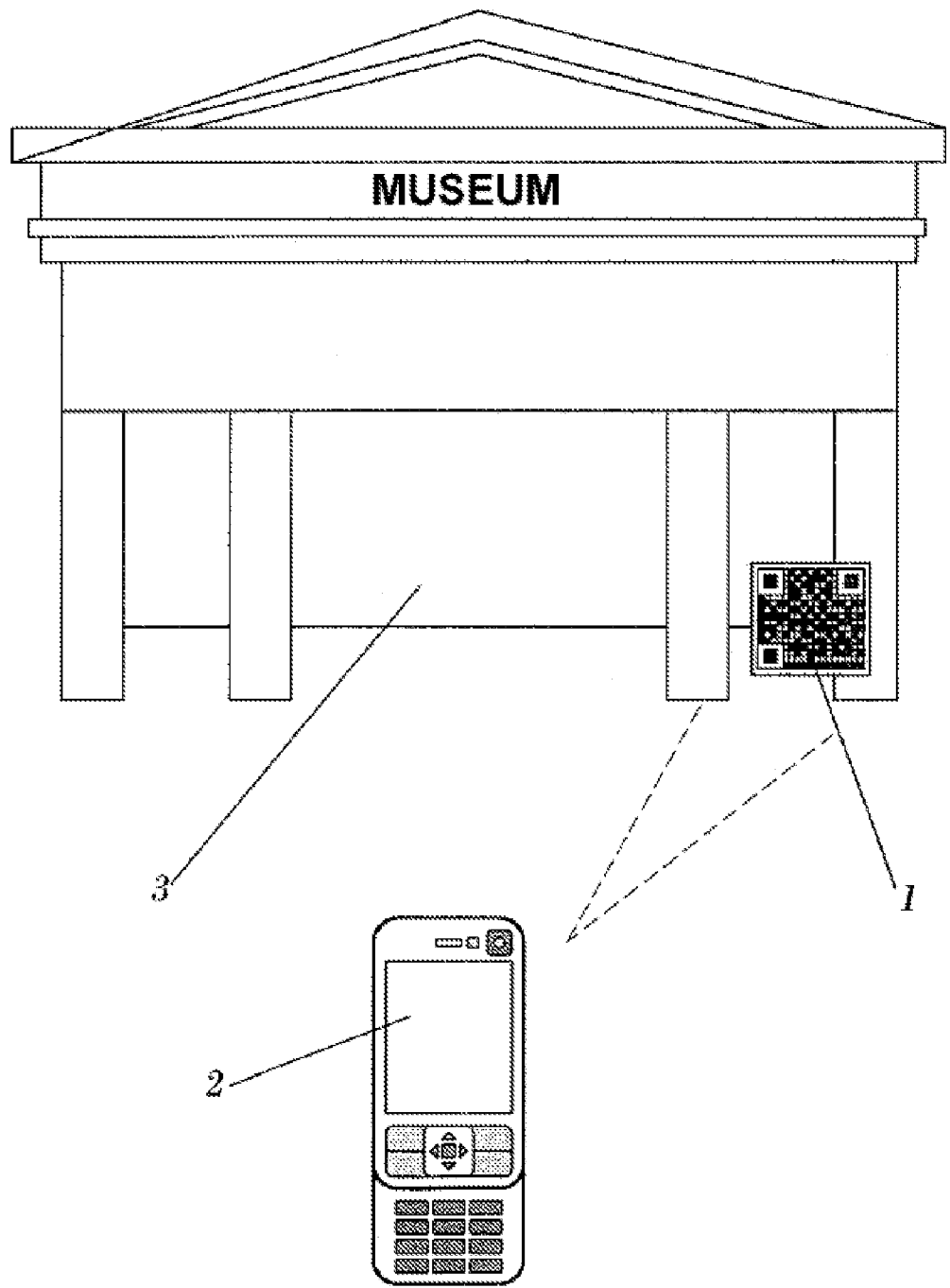
FIG. 1 shows a schematic depiction of an example of applying the method of the invention in which a two-dimensional code in the proximities of a museum is shown.

FIG. 1 shows a possible use of the method of the invention. In this case, in the proximities of a museum, either at the door, in the foyer or in a duly signaled support inside or outside the museum, there will be a two-dimensional code (1) with relevant information about the museum, such as its geographical location (3), the name of the museum, its opening hours, its information telephone number, the most representative painters, their works and the rooms where they are exhibited. How this information is obtained will be described below.

The process of decoding the two-dimensional code (1) by a telecommunications device (2), for example by a mobile telephone, starts by scanning or photographing said two-dimensional code (1). The telecommunications device (2) must have an application for interpreting the two-dimensional code (1) and thus be able to extract the information contained therein. If the telecommunications device (2) does not have said application, the latter could be provided by the service provider or by accessing an Internet page and downloading said program.

Once the two-dimensional code (1) is scanned, an application will obtain the sequence of bytes contained in the two-dimensional code (1). It should be mentioned in this sense that the present invention describes a process using two-dimensional codes, not being limited to any concrete or specific type of two-dimensional codes. For all purposes, once the information of the two-dimensional code (1) is obtained, which type of coding has been performed will be irrelevant to the method of the invention. A change in the two-dimensional codes will only imply installing a new application which interprets said change in the telecommunications device (2).

Once the sequence of bytes is obtained, the signature stored in the first and second byte will be checked to see if it corresponds to that established for this type of two-dimensional codes, i.e., if the two-dimensional code (1) contains information with respect to the position of the location (3) where the two-dimensional code (1) is located and if it additionally stores information on the location (3). The signature assigned to this type of code is 'WY', therefore in the event that the retrieved signature does not coincide with that previously defined, an error code will be displayed.

If the signature of the two-dimensional code (1) is 'WY', the information of the code will be interpreted. The common data for any version of two-dimensional code (1) are:

The third byte contains status information. Specifically, data about the version of the code in the three most significant bits, then the most significant bit of the latitude coordinate followed by the two most significant bits of the longitude coordinate and two free bits.

The fourth, fifth and sixth bytes store information with respect to the latitude coordinate of the point where the two-dimensional code (1) is located.

The seventh, eighth and ninth bytes store information with respect to the longitude coordinate of the point where the two-dimensional code (1) is located.

The tenth byte comprises information with respect to a sequential identification number. The way to code this sequential number will depend on the version of the code.

Commencing from the eleventh byte, the two-dimensional code (1) comprises information relating to the location (3) of the two-dimensional code (1) in at least three languages. Additionally, and again depending on the version of the code, the code could include data with respect to the height of the location (3) where the two-dimensional code (1) is located with respect to a height reference.

The versions of the two-dimensional code (1) defined relate to whether or not the data of height of the location (3) as well as the coding of said height exist.

The version of the code '001' does not contemplate the presence of data of height in the two-dimensional code (1). Thus, the sequential number will occupy the entire tenth byte. Commencing from the eleventh byte the information of the location (3) will be presented.

Version '010' includes information of height in compact format in the two-dimensional code (1), i.e., it is stored in 12 bits, four of them would be the least significant bits of the tenth byte, leaving the other four bits for the sequential number, the eleventh byte occupying the other eight bits. Commencing from the twelfth byte, data associated with the location (3) will be stored, as discussed below.

The height in compact format allows defining 4,096, $2^{12}$ units of said parameter. The chosen unit is meters, therefore the height range that can be defined is 4,096 meters. The origin of heights has been fixed at the point below sea level, i.e., the Dead Sea, which is located 420 meters below sea level. Thus, a location (3) located 130 meters above sea level would be assigned a height of 550, coded as 001000100110, the first four bits, 010, being occupied by the four least significant bits of the tenth byte and the other eight bits being occupied by the eleventh byte, 00100110. The algorithm will decode and obtain the value 550, from which 420 will be subtracted to obtain the information of height above sea level. This version will be the most used version since it covers up to a height of 3,676 meters where most human activity takes place.

The version '011' stores the information of height in two bytes, being able to define 65,536, $2^{16}$, units of height. In this case, the unit used is also meters, therefore height ranges from 65,536 meters in height could be stored. In this case, the origin of heights is defined at 12,000 meters below sea level. The information will be stored in the eleventh and twelfth byte, the tenth byte being provided exclusively for the sequential number.

The longitude and latitude coordinate data are also stored with a precision of one meter. Thus, in order to have said precision and by taking into consideration that the line of maximum longitude measures approximately 40,000.000 meters and a meridian 20,000,000 meters, the need of having 25 bits for the latitude and 26 for the longitude is established. Said values are calculated according to the following formula:

$$\text{Latitude bits} = \frac{\ln(40,000,000)}{\ln(2)} \approx 26$$

$$\text{Longitude bits} = \frac{\ln(20,000,000)}{\ln(2)} \approx 25$$

As has been described, the fourth, fifth and sixth bytes store the twenty-four least significant bits of the latitude, meanwhile the most significant is stored in the fourth bit of the status byte. With respect to the longitude, it occupies the seventh, eighth and ninth bytes plus the two following bits of that just mentioned for the latitude in the status byte.

With respect to the information relating to the location (3), it will be stored in three languages in the two-dimensional code (1) for all those data having text which can be translated. The data will be coded in different fields, each of them having a label or letter identifying what type of information it contains. Typical labels are, for example, 'N' for name, 'D' for description, 'T' for telephone, 'U' for URL or 'S' for SMS. In the particular case described, for example, labels such as 'A' for painters, 'P' for paintings and 'L' for rooms can be added. For the purpose of knowing the length of the field, a number having two bytes which establishes the length of the data field could be included or a sentinel character which, upon being read, marks the end of the field could be located at the end of the field. For those fields containing information susceptible to being translated, such as the fields 'D' for description for example, they will include two letters for identifying the language of the information.

The fields susceptible to being translated will be stored in three languages. Those that are non-variable, since it is a telephone number for example, will not contemplate any distinction according to the language. In a similar manner, the telecommunications device (2) could have a configured ordered list of languages in which the information can be displayed for example in Spanish, English and French or Catalan, Spanish and English. Since the information of the two-dimensional code (1) is stored in three languages, the information of the code coinciding with one of the languages selected in the telecommunications device (2) will be used. If more than one language coincides, the language located higher up on the ordered list of languages elaborated by the user, i.e., the language of highest priority, will be chosen.

Figure 2:
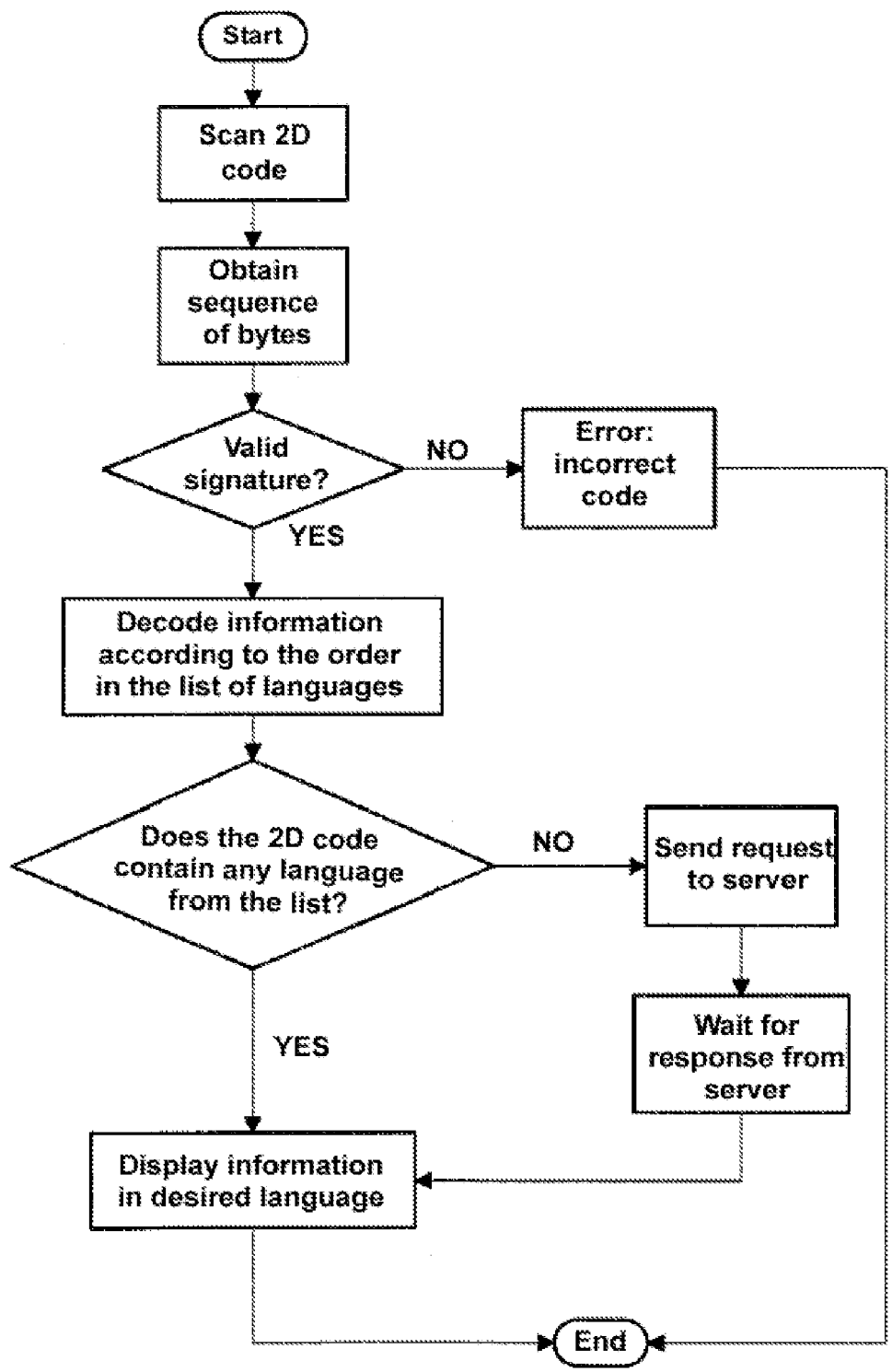
FIG. 2 shows a flow chart of the actions performed in the device to decode and to display the information contained in a two-dimensional code.

In the previous case, the duly formatted information will be displayed on the screen of the telecommunications device (2) according to the labels of the fields. All the stages or steps described up until now are summarized in the flow chart of FIG. 2.

Figure 3:
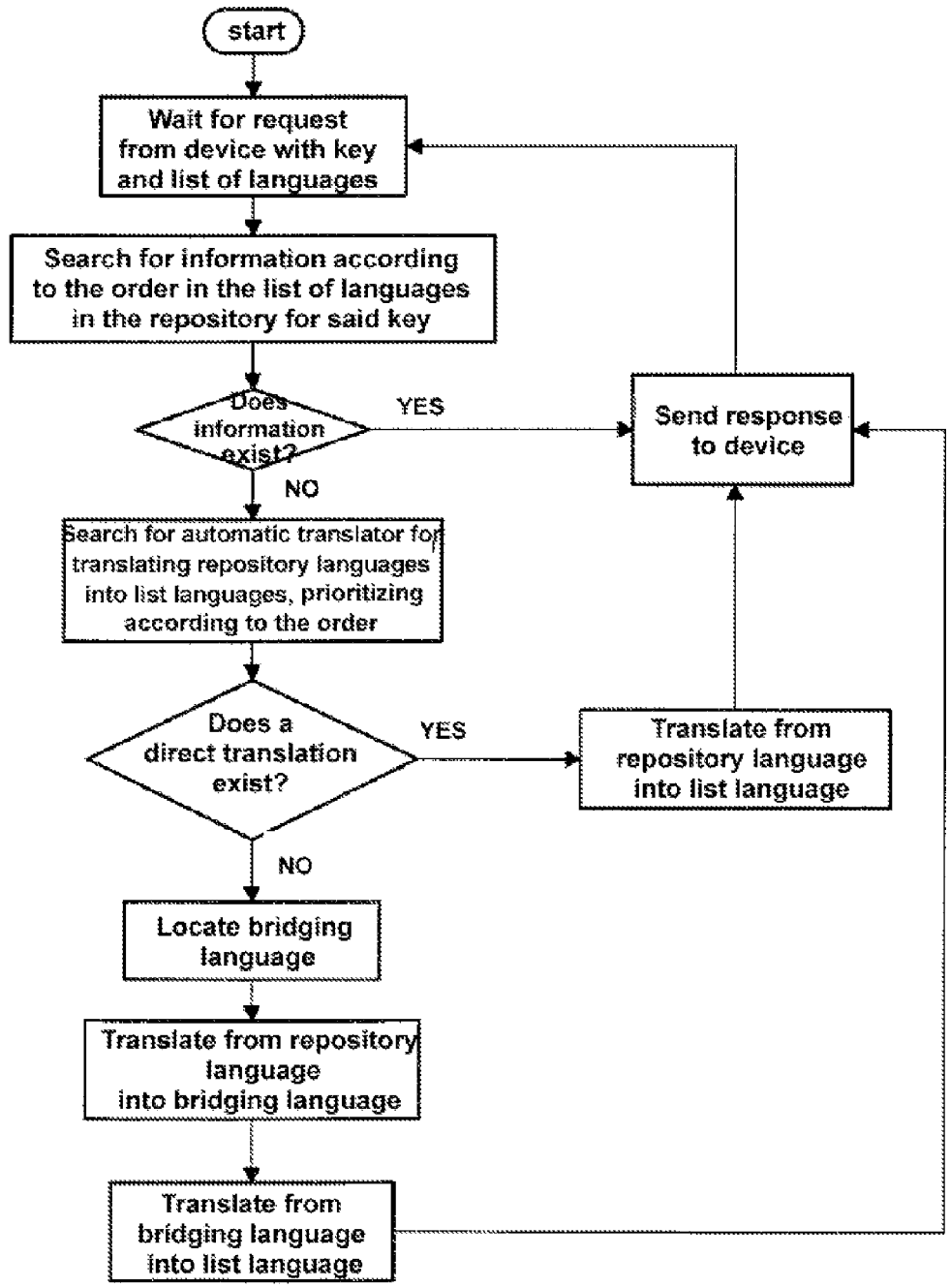
FIG. 3 shows a flow chart of the actions performed in the server for the purpose of obtaining a translation of the message contained in the two-dimensional code.

If none of the languages of the two-dimensional code (1) coincides with the languages of the telecommunications device (2), authorization will be requested from the user with respect to whether he wishes to connect to a server to obtain a translation of the information contained in the two-dimensional code (1). For accessing said translation, the information contained in the third to tenth bytes, including the information of height if the version of the code is '010' or '011', will be used as key. Additionally, the ordered list of languages of the telecommunications device (2) will be sent. This process is illustrated in FIG. 3.

The information of the status byte, latitude, longitude, sequential number and possible data of height, entails a unique key based on which the possible translations stored in a repository in the server could be accessed. The access will be performed in a sequential manner, requesting the translation of the information for the established key into the first language of the ordered list, if it is not available, the second language, and if the answer is again negative, the third language. In the moment in which the translation is obtained, the process will end sending the translation to the telecommunications device (2) so that the complete information of the two-dimensional code (1) is displayed.

If there is not a translation in any of the languages of the telecommunications device (2) in the repository, an automatic translation will be obtained. Firstly, an attempt would be made to obtain a direct translation in the extent that said translation is possible and its quality is acceptable. If it is not possible to perform a direct translation or if the translation is not reliable, a bridging language will be used, i.e., a language into which the information of the code will be translated in order to subsequently obtain a new translation of the first translation into a language of the telecommunications device (2). Due to the possible error accumulated in the two translations preformed, the fact of having obtained the information through automatic translations could be notified to user together with the information of the code.

The method described applies for mobile telephones as well as for electronic diaries with access to a data network. The types of two-dimensional codes which can be used, as has been discussed, can be of any type, such as Datamatrix or QR codes for example.

In view of this description and set of drawings, the person skilled in the art will understand that the invention has been described according to a preferred embodiment thereof, but that multiple variations can be introduced in said preferred embodiment without departing from the object of the invention as it has been claimed.

The invention claimed is:

1. A method of obtaining information associated with a location, the information being contained in a two-dimensional code close to the location, the method, when executed by the telecommunications device, comprising the steps of:
   (a) scanning the two-dimensional code through a camera in a telecommunication device, the telecommunication device comprising an ordered list of languages in which to display information;
   (b) decoding by the telecommunications device of the scanned two-dimensional code and obtaining a message provided in a plurality of bytes, wherein
      a first byte and a second byte relate to a signature,
      a third byte corresponds to a status byte,
      a fourth byte, a fifth byte, and a sixth byte store information with respect to a latitude coordinate of a point where the two-dimensional code is located,
      a seventh byte, an eighth byte, and a ninth byte store information with respect to a longitude coordinate of the point where the two-dimensional code is located,
      a tenth byte comprises information with respect to a sequential identification number,
      an eleventh byte comprises information relating to the point where the two-dimensional code is located in at least three languages,
   (b) determining by the telecommunications device if at least one language of the ordered list of languages of the telecommunications device coincides with at least one of the languages in which the information relating to the point where the two-dimensional code is located is stored in the two-dimensional code, then
      in response to a positive determination, displaying by the telecommunications device said information in the language coinciding with the language of highest priority in the ordered list of languages of the telecommunications device together with the longitude coordinate and latitude coordinate data,
      in response to a negative determination, where none of the languages of the ordered list of languages of the telecommunications device coincides with the languages in which the information relating to the point where the two-dimensional code is located is stored in the two-dimensional code;
   (c) accessing a server, through the telecommunications device, and obtaining a translation of the information relating to the point where the two-dimensional code is located;
   (d) accessing, through the telecommunications device, the translation through a unique key formed by the status byte, the latitude coordinate, the longitude coordinate, and the sequential identification number stored in the message together with the ordered list of languages of the telecommunications device; and
   (e) displaying the translation together with the longitude coordinate and latitude coordinate data as the information associated with the location.

2. The method of claim 1, wherein step (c) comprises accessing, through the server, a repository where there is stored for each unique key the information relating to the point where the two-dimensional code is located translated to at least three languages, and
returning, through the server, the information to the telecommunications device in the language coinciding with the language of highest priority in the ordered list of languages of the telecommunications device.

3. The method of claim 2, wherein if there is no information is any of the languages of the ordered list of languages of the device in the repository, an automatic translation of the information relating to the point where the two-dimensional code is located to the language of highest priority in the ordered list of languages of the device is obtained.

4. The method of claim 3, wherein step (c) comprises translating the information relating to the point where the two-dimensional code is located into a third language, the third languages acting as bridge between the information relating to the point where the two-dimensional code is located and the language of highest priority in the ordered list of languages of the telecommunications device.

5. The method of claim 1, wherein the status byte comprises information with respect to the version of the code, the most significant bit of the latitude coordinate and the two most significant bits of the longitude coordinate.

6. The method of claim 1, wherein the tenth byte only stores information with respect to the sequential identification number in its eight bits.

7. The method of claim 6, wherein the eleventh and twelfth byte store information of a first height coordinate with respect to a first height reference of the point where the two-dimensional code is located.

8. The method of claim 1, wherein the tenth byte stores in the first four bits information relating to the sequential identification number and in the second four bits the four most significant bits of a second height coordinate with respect to a second height reference of the point where the two-dimensional code is located, and the eleventh byte comprises the eight least significant bits of the second height coordinate of the point where the two-dimensional code is located.

9. The method of claim 7, wherein the unique key additionally comprises the information of the first height coordinate of the point where the two-dimensional code is located.

10. The method of claim 8, wherein the unique key additionally comprises the information of the second height coordinate of the point where the two-dimensional code is located.

* * * * *